US010239511B2

(12) United States Patent
Matsunaga

(10) Patent No.: US 10,239,511 B2
(45) Date of Patent: Mar. 26, 2019

(54) HYDRAULIC PRESSURE GENERATION APPARATUS

(71) Applicant: AUTOLIV NISSIN BRAKE SYSTEMS JAPAN CO., LTD., Jeda, Nagano (JP)

(72) Inventor: Yoshiteru Matsunaga, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 7 days.

(21) Appl. No.: 15/471,188

(22) Filed: Mar. 28, 2017

(65) Prior Publication Data

US 2017/0282879 A1    Oct. 5, 2017

(30) Foreign Application Priority Data

Mar. 30, 2016 (JP) ................................. 2016-069580

(51) Int. Cl.
*B60T 8/36* (2006.01)
*B60T 8/40* (2006.01)
(Continued)

(52) U.S. Cl.
CPC ............ *B60T 13/745* (2013.01); *B60T 8/368* (2013.01); *B60T 8/4081* (2013.01);
(Continued)

(58) Field of Classification Search
CPC .... B60T 13/745; B60T 13/142; B60T 13/143; B60T 11/22; B60T 8/368
(Continued)

(56) References Cited

U.S. PATENT DOCUMENTS

2003/0024245 A1* 2/2003 Fulks .................... B60T 13/745
60/545
2013/0207452 A1* 8/2013 Gilles ................... B60T 8/4018
303/9.75
(Continued)

FOREIGN PATENT DOCUMENTS

EP          3184384       6/2017
JP        2014525875    10/2014
WO       20150173134    11/2015

OTHER PUBLICATIONS

European Search Report for EP Application No. 17163548.5-1762 dated Jul. 20, 2017, 8 pages.

*Primary Examiner* — Robert A. Siconolfi
*Assistant Examiner* — San M Aung
(74) *Attorney, Agent, or Firm* — Andrew M. Calderon; Roberts Mlotkowski Safran Cole & Calderon, P.C.

(57) ABSTRACT

One embodiment provides a hydraulic pressure generation apparatus including: a base body; a motor; a reservoir tank; a master cylinder which generates a brake hydraulic pressure by a brake manipulator; and a slave cylinder which generates a brake hydraulic pressure the motor. The base body includes: a first cylinder hole which is a bottomed cylinder hole, and in which the first piston is inserted; a second cylinder hole which is a bottomed cylinder hole, and in which the second piston is inserted; and a supply passage which leads from the reservoir tank to a hydraulic chamber of the slave cylinder. The supply passage is provided with a check valve which permits only inflow of brake fluid from the reservoir tank to a side of the slave cylinder, near a brake fluid discharge port of the second cylinder hole.

19 Claims, 11 Drawing Sheets

(51) Int. Cl.
  *B60T 11/16* (2006.01)
  *B60T 11/22* (2006.01)
  *B60T 13/74* (2006.01)
  *B60T 15/36* (2006.01)

(52) U.S. Cl.
  CPC ............. *B60T 11/165* (2013.01); *B60T 11/22* (2013.01); *B60T 15/36* (2013.01)

(58) Field of Classification Search
  USPC .......................................................... 303/11
  See application file for complete search history.

(56) References Cited

U.S. PATENT DOCUMENTS

| | | | |
|---|---|---|---|
| 2014/0298797 A1* | 10/2014 | Murayama | B60T 8/368 60/533 |
| 2015/0025767 A1* | 1/2015 | Feigel | B60T 8/36 701/70 |
| 2015/0158466 A1* | 6/2015 | Nakamura | B60T 11/16 303/3 |
| 2015/0166030 A1* | 6/2015 | Kobayashi | B60T 13/58 303/14 |
| 2015/0224972 A1 | 8/2015 | Feigel | |
| 2017/0072920 A1 | 3/2017 | Besier et al. | |

\* cited by examiner

HYDRAULIC PRESSURE GENERATION APPARATUS

CROSS-REFERENCE TO RELATED APPLICATION(S)

This application claims priority from Japanese Patent Application No. 2016-069580 filed on Mar. 30, 2016, the entire contents of which are incorporated herein by reference.

FIELD

The present invention relates to a hydraulic pressure generation apparatus that is used in a vehicular brake system.

BACKGROUND

A hydraulic pressure generation apparatus that generates a brake hydraulic pressure according to a stroke length (action length) of a brake pedal may be equipped with a master cylinder for generating a brake hydraulic pressure by a piston linked to the brake pedal and a slave cylinder for generating a brake hydraulic pressure by a piston having a motor as a drive source.

In such hydraulic pressure generation apparatus, the master cylinder and the slave cylinder may be provided in a single base body (refer to JP-2014-525875-A, for example).

In the hydraulic pressure generation apparatus disclosed in JP-2014-525875-A, a pressure medium storage container (reservoir tank) is disposed on the top surface of a housing (base body). Brake fluid is supplied from the reservoir tank to the master cylinder and the slave cylinder.

This type of hydraulic pressure generation apparatus may be provided with a fluid suction function of sucking brake fluid from the reservoir tank into the slave cylinder through a supply passage for securing brake fluid. To prevent transmission of a hydraulic pressure generated in the slave cylinder to the reservoir tank side, a check valve may be provided to the supply passage. The check valve permits inflow of brake fluid from the reservoir tank side to the slave cylinder side.

Depending on the installation position of the check valve affects the efficiency of suction of brake fluid into the slave cylinder because of increase in pipe resistance and other factors and lowers the ease of layout of the hydraulic pressure generation apparatus.

SUMMARY

One object of the invention is to provide a hydraulic pressure generation apparatus that, while it has a check valve in a supply passage leading from a reservoir tank to a hydraulic chamber of a slave cylinder, can be laid out more easily and can perform high-efficiency suction of brake fluid.

An aspect of the present invention provides
a hydraulic pressure generation apparatus including:
a base body;
a motor attached to the base body;
a reservoir tank which is attached to the base body and stores a brake fluid;
a master cylinder which generates a brake hydraulic pressure by a first piston which is linked to a brake manipulator; and
a slave cylinder which generates a brake hydraulic pressure by a second piston by the motor as a drive source,
wherein the base body includes:
a first cylinder hole which is a bottomed cylinder hole, and in which the first piston is inserted;
a second cylinder hole which is a bottomed cylinder hole, and in which the second piston is inserted; and
a supply passage which leads from the reservoir tank to a hydraulic chamber of the slave cylinder,
wherein the supply passage is provided with a check valve which permits only inflow of brake fluid from the reservoir tank to a side of the slave cylinder, and
wherein the check valve is disposed near a brake fluid discharge port of the second cylinder hole.

With this configuration, since the check valve is disposed near the discharge port of the slave cylinder, the hydraulic pressure generation apparatus can be laid out more easily while high-efficiency suction of brake fluid is secured.

There may be provided
the hydraulic pressure generation apparatus,
wherein a portion of the slave cylinder near a bottom surface of the second cylinder hole projects outward in a direction of an axial line of the second cylinder hole with respect to other portions of the base body.

With this configuration, the base body 100 can be reduced in weight and the space occupied by the portion, located on side of the bottom surface of the second cylinder hole, of the base body can be narrowed. This makes it easier to mount the hydraulic pressure generation apparatus in a vehicle.

There may be provided
the hydraulic pressure generation apparatus,
wherein an axial line of the check valve is parallel with an axial line of the second cylinder hole.

With this configuration, the check valve can be disposed compactly adjacent to the second cylinder hole of the slave cylinder outside it in its radial direction.

There may be provided
the hydraulic pressure generation apparatus,
wherein the check valve is disposed on the master cylinder side of the slave cylinder.

With this configuration, the check valve 75 can be disposed in such a manner that it does not stick out to outside the hydraulic pressure generation apparatus, utilizing a space between the slave cylinder and the master cylinder.

There may be provided
the hydraulic pressure generation apparatus,
wherein the check valve is disposed on the motor side of the slave cylinder.

With this configuration, the check valve can be disposed in such a manner that it does not stick out to outside the hydraulic pressure generation apparatus, utilizing a space between the slave cylinder and the motor.

There may be provided
the hydraulic pressure generation apparatus,
wherein an axial line of the first cylinder hole, the axial line of the second cylinder hole, and an axial line of an output shaft of the motor are parallel with each other, and
wherein, when viewed in the axial line of the second cylinder hole, the axial line of the check valve is located inside a triangle that connects the axial line of the first cylinder hole, the axial line of the second cylinder hole, and the axial line of the output shaft.

With this configuration, the check valve can be disposed inside the hydraulic pressure generation apparatus without sticking out to outside it, utilizing a space surrounded by the master cylinder, the slave cylinder, and the motor.

There may be provided
the hydraulic pressure generation apparatus, wherein the axial line of the check valve is located above the axial line of the second cylinder hole.

This structure helps air bubbles that might otherwise be contained in brake fluid escape upward, and thereby improves the property of bleeding air from the brake fluid to be pressurized that exists in the slave cylinder.

There may be provided the hydraulic pressure generation apparatus, wherein a hydraulic passage as a portion of the supply passage which extends from the check valve toward the reservoir tank is parallel with the axial line of the second cylinder hole.

With this configuration, the hydraulic passage extending from the check valve toward the reservoir tank can be disposed compactly adjacent to the second cylinder hole of the slave cylinder outside it in its radial direction.

There may be provided the hydraulic pressure generation apparatus, wherein an axial line of the check valve coincides with an axial line of the second cylinder hole.

With this configuration, the check valve can be disposed compactly adjacent to the second cylinder hole of the slave cylinder in its axial direction.

According to the above-mentioned configurations, the hydraulic pressure generation apparatus can be laid out more easily while high-efficiency suction of brake fluid is secured in the case where it is provided with a check valve in a supply passage leading from a reservoir tank to a hydraulic chamber of a slave cylinder.

DETAILED DESCRIPTION

Figure 1:
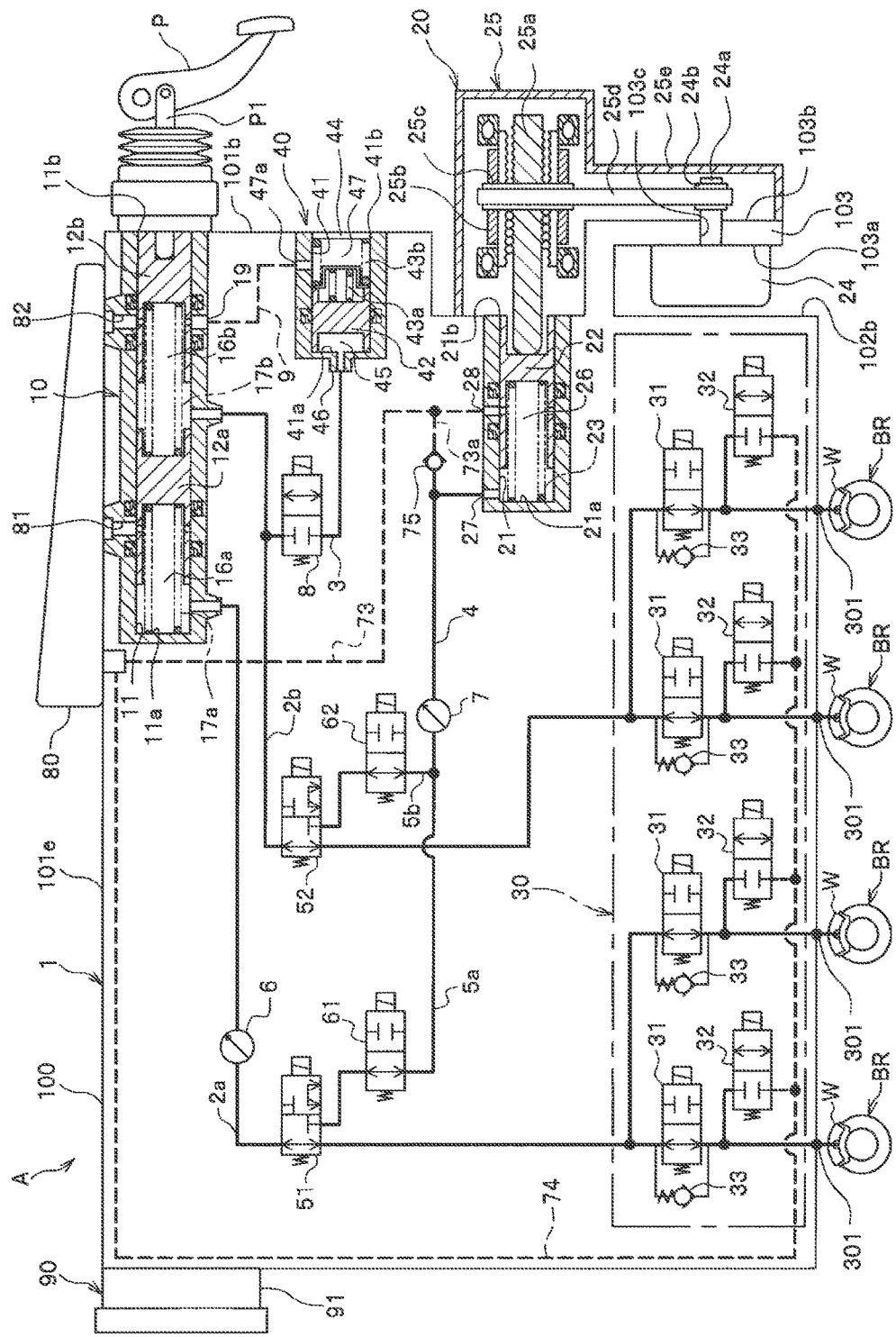
FIG. 1 is a diagram showing the overall configuration of a vehicular brake system that employs a hydraulic pressure generation apparatus according to an embodiment.

An embodiment will be described in detail by referring to the drawings when necessary. The embodiment is directed to a hydraulic pressure generation apparatus 1 that is applied to a vehicular brake system A.

As shown in FIG. 1, the vehicular brake system A is equipped with both of a by-wire brake system that operates in starting an engine, an electric motor, or the like and a hydraulic brake system that operates in, for example, stopping the engine, an electric motor, or the like.

The vehicular brake system A can be installed in hybrid vehicles which use both of an engine (internal combustion engine) and a motor, electric vehicles and fuel cell vehicles which use only a motor as a motive power source, and ordinary vehicles which use only an engine as a motive power source.

The vehicular brake system A is equipped with the hydraulic pressure generation apparatus 1 which generates a brake hydraulic pressure according to a stroke length (action length) of a brake pedal (brake manipulator) P and assists stabilization of vehicle behavior.

The hydraulic pressure generation apparatus 1 is equipped with a base body 100, a master cylinder 10 for generating a brake hydraulic pressure according to a stroke length of the brake pedal P, a stroke simulator 40 for giving a simulated manipulation reaction force to the brake pedal P, and a slave cylinder 20 for generating a brake hydraulic pressure using a motor 24 as a drive source. The hydraulic pressure generation apparatus 1 is further equipped with a hydraulic control device 30 for assisting stabilization of vehicle behavior by controlling the pressures of brake fluids that act on wheel cylinders W of wheel brakes BR, respectively, an electronic control unit 90, and a reservoir tank 80.

Figure 2:
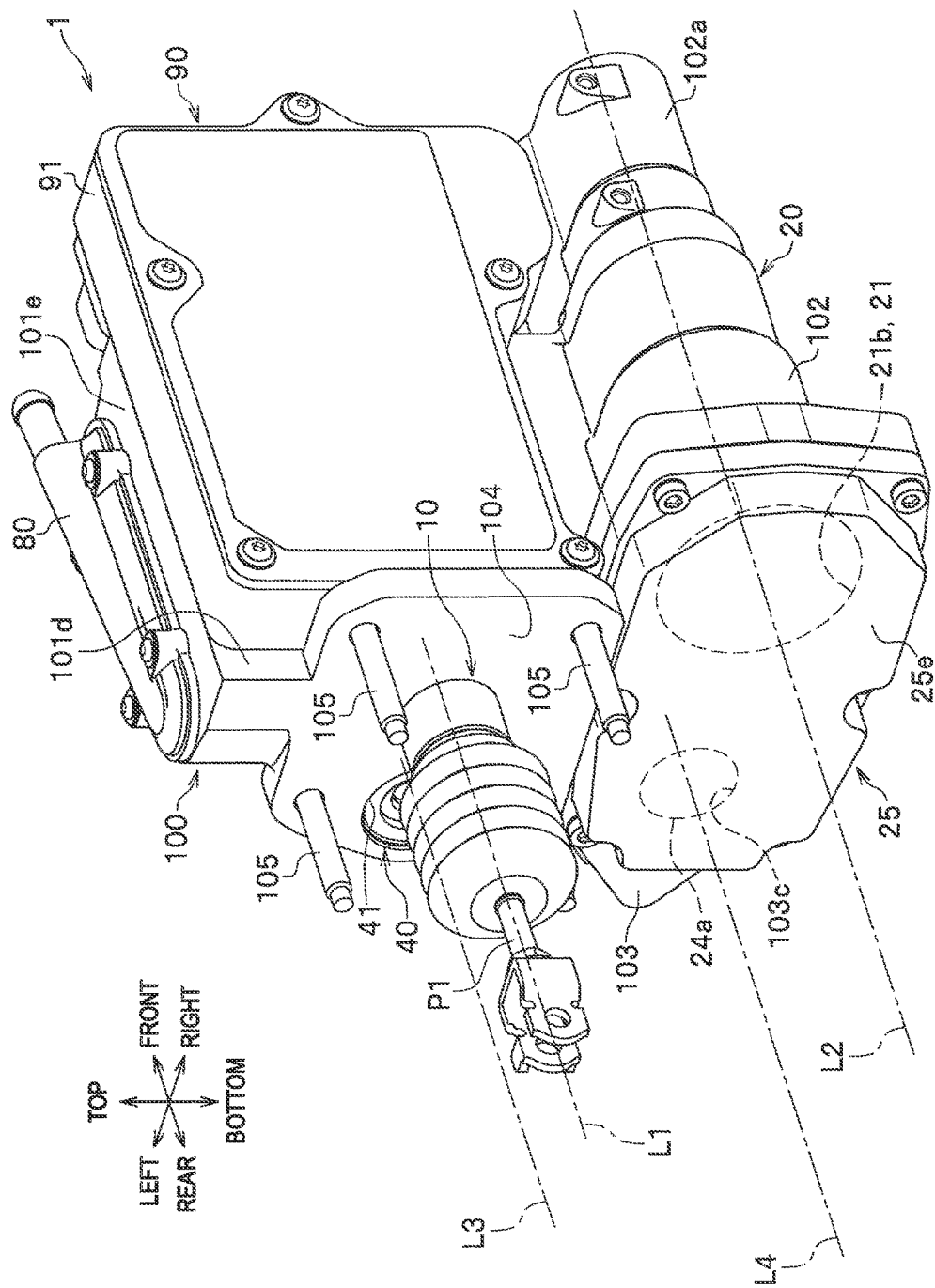
FIG. 2 is a perspective view of the hydraulic pressure generation apparatus according to the embodiment as viewed from a top-rear-right position.

Although the directions that will be used in the following description are ones that are set for the sake of convenience of description of the hydraulic pressure generation apparatus 1, they approximately coincide with directions that occur when the hydraulic pressure generation apparatus 1 is installed in a vehicle. More specifically, as shown in FIG. 2, the forward direction (i.e., the direction toward the front end) is defined as a direction in which a rod P1 is moved when the brake pedal P is stepped on and the rearward direction (i.e., the direction toward the rear end) is defined as a direction in which the rod P1 is moved when the brake pedal P returns. The left-right direction is defined as a horizontal direction that is perpendicular to the movement direction of the rod P1 (front-rear direction).

The base body 100 is a metal block to be mounted in a vehicle (see FIG. 3), and is formed inside with three cylinder holes 11, 21, and 41 and plural hydraulic passages 2a, 2b, 3, 4, 5a, 5b, 73, 74, etc. Various components such as a reservoir tank 80 and the motor 24 are attached to the base body 100.

Figure 7:
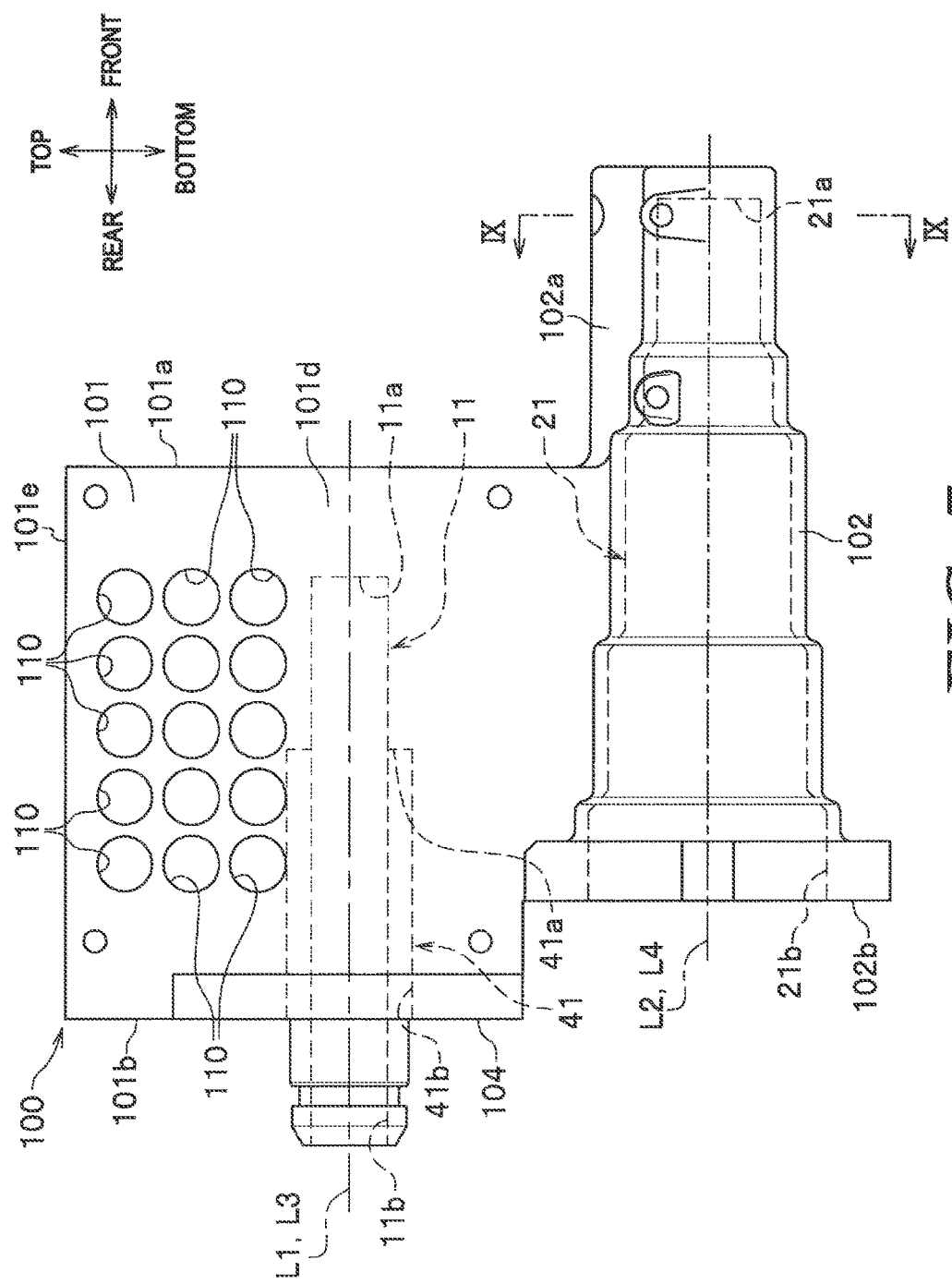
FIG. 7 is a right side view of the base body of the hydraulic pressure generation apparatus according to the embodiment.

As shown in FIG. 7, the base body 100 is formed inside with the first cylinder hole 11, the second cylinder hole 21, and the third cylinder hole 41 each of which is a bottomed cylindrical hole. The first cylinder hole 11, the second cylinder hole 21, and the third cylinder hole 41 extend in the front-rear direction, and the axial lines L1, L2, and L3 of the respective cylinder holes 11, 21, and 41 are arranged side by side and parallel with each other. The cylinder holes 11, 21, and 41 have openings at their rear ends in rear surfaces 101b and 102b of the base body 100.

As shown in FIG. 1, the master cylinder 10 is of a tandem piston type and is equipped of two first pistons 12a and 12b (secondary piston and primary piston) inserted in the first cylinder hole 11 and two coil springs 17a and 17b disposed in the first cylinder hole 11.

A bottom-side pressure chamber 16a is formed between a bottom surface 11a of the first cylinder hole 11 and the bottom-side first piston 12a (secondary piston). The coil spring 17a is disposed in the bottom-side pressure chamber 16a. The coil spring 17a serves to push back, toward the opening 11b, the first piston 12a that has been moved toward the bottom surface 11a.

An opening-side pressure chamber 16b is formed between the bottom-side first piston 12a and the opening-side first piston 12b (primary piston). The coil spring 17b is disposed in the opening-side pressure chamber 16b. The coil spring 17b serves to push back, toward the opening 11b, the first piston 12b that has been moved toward the bottom surface 11a.

The rod P1 of the brake pedal P is inserted in the first cylinder hole 11. A tip portion of the rod P1 is connected to the opening-side first piston 12b, which is thereby linked to the brake pedal P by the rod P1.

When receiving a stepping force exerted on the brake pedal P, the two first pistons 12a and 12b slide in the first cylinder hole 11 and pressurize the brake fluids existing in the bottom-side pressure chamber 16a and the opening-side pressure chamber 16b.

The reservoir tank 80 is a container for storing brake fluid, and is attached to a top surface 101e of the base body 100 (see FIG. 2). Two fluid supply portions that project from the bottom surface of the reservoir tank 80 are inserted in two respective reservoir union ports 81 and 82 which are formed in the top surface 101e of the base body 100. Brake fluid is supplied to the bottom-side pressure chamber 16a and the opening-side pressure chamber 16b from the reservoir tank 80 through the reservoir union ports 81 and 82, respectively.

The stroke simulator 40 is equipped with a third piston 42 which is inserted in the third cylinder hole 41, a lid member 44 which closes an opening 41b of the third cylinder hole 41, and two coil springs 43a and 43b which are disposed between the third piston 42 and the lid member 44.

A pressure chamber 45 is formed between a bottom surface 41a of the third cylinder hole 41 and the third piston 42. The pressure chamber 45 formed in the third cylinder hole 41 communicates with the opening-side pressure chamber 16b of the first cylinder hole 11 via a branch hydraulic passage 3 and part of a second main hydraulic passage 2b (described later).

In the stroke simulator 40, the third piston 42 is moved against the urging forces of the coil springs 43a and 43b by a brake hydraulic pressure generated in the opening-side pressure chamber 16b of the master cylinder 10. The third piston 42 thus urged gives a simulated manipulated reaction force to the brake pedal P.

The slave cylinder 20 is of a single piston type, and is equipped with a second piston 22 which is inserted in the second cylinder hole 21, a coil spring 23 which is disposed in the second cylinder hole 21, a motor 24, and a drive power transmission unit 25.

A pressure chamber (hydraulic chamber) 26 is formed between a bottom surface 21a of the second cylinder hole 21 and a second piston 22. A coil spring 23 is disposed in the pressure chamber 26, and serves to push back, toward an opening 21b, the second piston 22 that has been moved toward the bottom surface 21a.

The motor 24 is an electric servo motor which is drive-controlled by the electronic control unit 90 (described later). An output shaft 24a projects rearward from a central portion of the rear surface of the motor 24.

Figure 4:
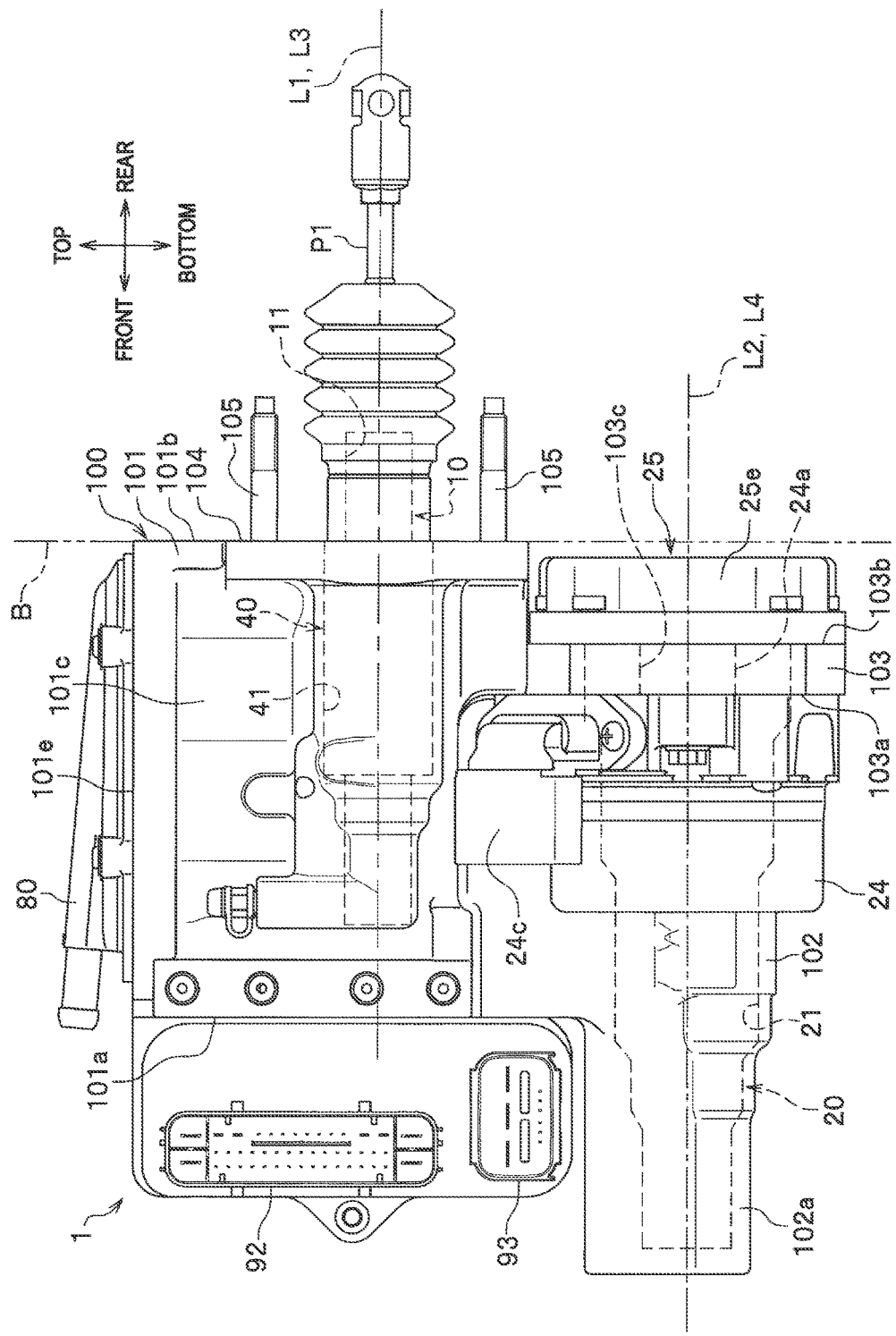
FIG. 4 is a left side view of the hydraulic pressure generation apparatus according to the embodiment.

As shown in FIG. 4, the motor 24 is attached to the front surface of a flange 103 of the base body 100. The output shaft 24a is inserted through an insertion hole 103c which is formed through the flange 103, and projects rearward past the flange 103. A drive-side pulley 24b is attached to a rear end portion of the output shaft 24a.

The drive power transmission unit 25 is a mechanism for converting rotational drive power of the output shaft 24a of the motor 24 into straight axial power.

The drive power transmission unit 25 is equipped with a rod 25a, a cylindrical nut member 25b which surrounds the rod 25a, a driven-side pulley 25c which is attached to the nut member 25b around its entire circumference, an endless belt 25d which is wound on the driven-side pulley 25c and the drive-side pulley 24b, and a cover member 25e.

A front portion of the rod 25a is inserted in the second cylinder hole 21 through its opening 21b, and the front end of the rod 25a is in contact with the second piston 22. A rear portion of the rod 25a projects rearward past the rear surface 102b of the base body 100.

A ball screw mechanism is provided between the outer circumferential surface of a rear portion of the rod 25a and the inner circumferential surface of the nut member 25b. The nut member 25b is fixed to the base body 100 via a bearing.

When the output shaft 24a is rotated, its rotational drive power is input to the nut member 25b via the drive-side pulley 24b, the belt 25d, and the driven-side pulley 25c. Straight axial power is given to the rod 25a by means of the ball screw mechanism provided between the nut member 25b and the rod 25a, whereby the rod 25a advances or retreats in the front-rear direction.

When the rod 25a is moved forward, the second piston 22 is pushed by the rod 25a. As a result, the second piston 22 slides in the second cylinder hole 21 and pressurizes the brake fluid existing in the pressure chamber 26.

Next, the hydraulic passages formed in the base body 100 will be described. As shown in FIG. 1, the two main hydraulic passages 2a and 2b originate from the first cylinder hole 11 of the master cylinder 10.

The first main hydraulic passage 2a leads from the bottom-side pressure chamber 16a of the master cylinder 10 to two wheel brakes BR via the hydraulic control device 30.

The second main hydraulic passage 2b leads from the opening-side pressure chamber 16b of the master cylinder 10 to the other two wheel brakes BR via the hydraulic control device 30.

The branch hydraulic passage 3 leads from the pressure chamber 45 of the stroke simulator 40 to the second main hydraulic passage 2b. The branch hydraulic passage 3 is provided with a normally closed solenoid valve 8, which serves to open or close the branch hydraulic passage 3.

The two communication passages 5a and 5b merge into a common hydraulic passage 4 which originates from the second cylinder hole 21 of the slave cylinder 20.

The first communication passage 5a leads from the common hydraulic passage 4 to the first main hydraulic passage 2a. The second communication passage 5b leads from the common hydraulic passage 4 to the second main hydraulic passage 2b.

A first switching valve 51 which is a three-directional valve is disposed at a connection point of the first main hydraulic passage 2a and the first communication passage 5a. The first switching valve 51 is a two-position, three-port solenoid valve.

In a state that the first switching valve 51 is at a first position shown in FIG. 1, the upstream side (master cylinder 10 side) and the downstream side (vehicle brake BR side) of the first main hydraulic passage 2a communicate and the first main hydraulic passage 2a and the first communication passage 5a do not.

In a state that the first switching valve 51 is at a second position, the upstream side and the downstream side of the first main hydraulic passage 2a do not communicate and the first communication passage 5a and the downstream side of the first main hydraulic passage 2a communicate.

A second switching valve 52 which is a three-directional valve is disposed at a connection point of the second main hydraulic passage 2b and the second communication passage 5b. The second switching valve 52 is a two-position, three-port solenoid valve.

In a state that the second switching valve 52 is at a first position shown in FIG. 1, the upstream side (master cylinder 10 side) and the downstream side (vehicle brake BR side) of the second main hydraulic passage 2b communicate and the second main hydraulic passage 2b and the second communication passage 5b do not.

In a state that the second switching valve 52 is at a second position, the upstream side and the downstream side of the second main hydraulic passage 2b do not communicate and the second communication passage 5b and the downstream side of the second main hydraulic passage 2b communicate.

The first communication passage 5a is provided with a first shutoff valve 61. The first shutoff valve 61 is a normally open solenoid valve. When the first shutoff valve 61 is closed being energized, the first communication passage 5a is shut off by the first shutoff valve 61.

The second communication passage 5b is provided with a second shutoff valve 62. The second shutoff valve 62 is a normally open solenoid valve. When the second shutoff valve 62 is closed being energized, the second communication passage 5b is shut off by the second shutoff valve 62.

Two pressure sensors 6 and 7 each serve to detect the magnitude of a brake hydraulic pressure, and pieces of information acquired by the pressure sensors 6 and 7 are output to the electronic control unit 90.

The first pressure sensor 6 is disposed upstream of the first switching valve 51 and detects a brake hydraulic pressure occurring in the master cylinder 10.

The second pressure sensor 7, which is disposed downstream of the second switching valve 52, detects a brake hydraulic pressure when the communication passages 5a and 5b communicate with the downstream sides of the main hydraulic passages 2a and 2b, respectively.

The slave cylinder supply passage 73 leads from the reservoir tank 80 to the slave cylinder 20, and is connected to the common hydraulic passage 4 by a branch supply passage 73a.

The branch supply passage 73a is provided with a check valve 75 that permits only inflow of brake fluid from the reservoir tank 80 side to the common hydraulic passage 4 side (slave cylinder 20 side). Provided in the branch supply passage 73a, the check valve 75 can properly prevent transmission of a hydraulic pressure generated by the slave cylinder 20 to the reservoir tank 80 side.

During an ordinary operation, brake fluid is supplied from the reservoir tank 80 to the slave cylinder 20 through the slave cylinder supply passage 73.

During a fluid suction control (described later), brake fluid is sucked from the reservoir tank 80 to the slave cylinder 20 through part of the slave cylinder supply passage 73, the branch supply passage 73a, and part of the common hydraulic passage 4.

The return passage 74 leads from the hydraulic control device 30 to the reservoir tank 80. Brake fluid that has escaped from the wheel cylinders W via the hydraulic control device 30 flows into the return passage 74. The brake fluid that has escaped to the return passage 74 is returned to the reservoir tank 80 through the return passage 74.

The hydraulic control device 30 serves to control, as appropriate, the pressure of brake fluid that acts on the wheel cylinder W of each wheel brake BR. The hydraulic control device 30 is configured so as to be able to perform an antilock brake control. The wheel cylinders W are connected to output ports 301 of the base body 100 by pipes, respectively.

The hydraulic control device 30 can increase, hold, or decrease the hydraulic pressure ("wheel cylinder pressure") that acts on each wheel cylinder W. The hydraulic control device 30 is equipped with inlet valves 31, outlet valves 32, and check valves 33.

Two inlet valves 31 are provided on two hydraulic passages that lead from the first main hydraulic passage 2a to two wheel brakes BR, respectively, and the other two inlet valves 31 are provided on the other two hydraulic passages that lead from the second main hydraulic passage 2b to the other two wheel brakes BR, respectively.

Each inlet valve 31 is a normally open linear solenoid valve, and its opening pressure can be adjusted according to the current flowing through its coil.

Being open during an ordinary operation, the inlet valves 31 allow the slave cylinder 20 to give hydraulic pressures to the respective wheel cylinders W. When the wheels are about to lock, the inlet valves 31 are closed by control of the electronic control unit 90 and thereby prevent application of hydraulic pressures to the respective wheel cylinders W.

The outlet valves 32 are normally closed solenoid valves that are disposed between the respective wheel cylinders W and the return passage 74.

The outlet valves 32, which are closed during an ordinary operation, are opened by control of the electronic control unit 90 when the wheels are about to lock.

The check valves 33 are connected to the respective inlet valves 31 in parallel. The check valves 33 are valves for permitting only inflow of brake fluid from the wheel cylinder W side to the slave cylinder 20 side (master cylinder 10 side). Thus, even while the input valves 31 are closed, the check valves 33 permit flow of brake fluid from the wheel cylinder W side to the slave cylinder 20 side.

The electronic control unit 90 is equipped with a housing 91 which is a resin box and a control board (not shown) which is housed in the housing 91. As shown in FIG. 2, the housing 91 is attached to a right side surface 101d of the base body 100.

As shown in FIG. 1, the electronic control unit 90 controls the operation of the motor 24 and the opening/closure of the valves according to programs etc. stored in advance on the basis of various information acquired from various sensors such as the two pressure sensors 6 and 7 and a stroke sensor (not shown).

The electronic control unit 90 also has a function of performing a fluid suction control. The fluid suction control is a control for securing a necessary amount of brake fluid in the slave cylinder 20 by sucking brake fluid into the slave cylinder 20 from the reservoir tank 80 via the slave cylinder supply passage 73. For example, the fluid suction control is performed in securing a necessary amount of brake fluid to pressurize the brake fluid in the slave cylinder 20 to a high hydraulic pressure range or in securing, in advance, a necessary amount of brake fluid in a state (steady state) that the fluid pressuring occurring in the slave cylinder 20 has become equal to a driver-requested value, to prepare for later pressurization.

Next, how the vehicular brake system A operates will be outlined. In the vehicular brake system A shown in FIG. 1, upon activation of the system A, the two switching valves 51 and 52 are energized and switching is thereby made from the first position to the second position (these positions were described above).

As a result, connection is established between the downstream side of the first main hydraulic passage 2a and the first communication passage 5a and between the downstream side of the second main hydraulic passage 2b and the second communication passage 5b. The master cylinder 10 is disconnected from the wheel cylinders W, and the slave cylinder 20 is connected to the wheel cylinders W.

Upon activation of the system A, the normally closed solenoid valve 8 provided on the branch hydraulic passage 3 is opened. As a result, a hydraulic pressure that is generated by the master cylinder 10 by a manipulation of the brake pedal P is transmitted to the stroke simulator 40 rather than the wheel cylinders W.

The hydraulic pressure in the pressure chamber 45 of the stroke simulator 40 is increased and the third piston 42 is moved toward the lid member 44 against the urging forces of the coil springs 43a and 43b, whereby the brake pedal P is allowed to make a stroke and a simulated manipulation reaction force is given to the brake pedal P.

If stepping on the brake pedal P is detected by the stroke sensor (not shown), the electronic control unit 90 drives the motor 24 of the slave cylinder 20, whereby the second piston 22 of the slave cylinder 20 is moved toward its bottom surface 21a. As a result, the pressure of the brake fluid in the pressure chamber 26 is increased.

The electronic control unit 90 compares a hydraulic pressure occurring in the slave cylinder 20 (i.e., a hydraulic pressure detected by the second pressure sensor 7) with a requested hydraulic pressure that corresponds to a manipulation amount of the brake pedal P, and controls the rotation speed of the motor 24 and other items on the basis of a comparison result.

In this manner, the vehicular brake system A increases the hydraulic pressure according to the manipulation amount of the brake pedal P. The hydraulic pressure generated by the slave cylinder 20 is applied to the hydraulic control device 30.

When the stepping on the brake pedal P is canceled, the electronic control unit 90 drives the motor 24 of the slave cylinder 20 in the reverse direction, whereby the second piston 22 is returned toward the motor 24 by the coil spring 23 and the pressure in the pressure chamber 26 is decreased.

If the detection value of the second pressure sensor 7 does not increase to a judgment reference value in the state that the motor 24 of the slave cylinder 20 is being driven, the electronic control unit 90 closes the two shutoff valves 61 and 62 and drives the slave cylinder 20 so as to increase its pressure.

If the detection value of the second pressure sensor 7 still does not increase, the electronic control unit 90 controls the valves so that the hydraulic pressure directly acts on the wheel cylinders W from the master cylinder 10 because there is a possibility that decrease of brake fluid is occurring in the paths located on the slave cylinder 20 side of the two shutoff valves 61 and 62.

If the detection value of the second pressure sensor 7 has increased when the slave cylinder 20 has been driven so as to increase its pressure with the two shutoff valves 61 and 62 closed, the electronic control unit 90 closes the first shutoff valve 61 and opens the second shutoff valve 62 and drives the slave cylinder 20 so as to increase its pressure.

If the detection value of the second pressure sensor 7 has increased resultantly, the electronic control unit 90 continues the elevation of the hydraulic pressure by the slave cylinder 20 through the second main hydraulic passage 2b because there is a possibility that decrease of brake fluid is occurring in the first main hydraulic passage 2a.

On the other hand, if the detection value of the second pressure sensor 7 does not increase even if the electronic control unit 90 has driven the slave cylinder 20 so as to increase its pressure with the first shutoff valve 61 closed and the second shutoff valve 62 opened, the electronic control unit 90 opens the first shutoff valve 61 and closes the second shutoff valve 62 and drives the slave cylinder 20 so as to increase its pressure.

If the detection value of the second pressure sensor 7 has increased resultantly, the electronic control unit 90 continues the elevation of the hydraulic pressure by the slave cylinder 20 through the first main hydraulic passage 2a because there is a possibility that decrease of brake fluid is occurring in the second main hydraulic passage 2b.

In the hydraulic control device 30, the wheel cylinder pressures of the respective wheel cylinders W are adjusted by the electronic control unit 90's controlling the open/closed states of the inlet valves 31 and the outlet valves 32.

For example, if the brake pedal P is stepped on in an ordinary state that the inlet valves 31 are open and the outlet valves 32 are closed, a hydraulic pressure generated by the slave cylinder 20 is transmitted to the wheel cylinders W as it is and the wheel cylinder pressures are increased.

In a state that the inlet valves 31 are closed and the outlet valves 32 are open, brake fluid flows out of the wheel cylinders W to the return passage 74 and the wheel cylinder pressures are decreased.

In a state that the inlet valves 31 and the outlet valves 32 are both closed, the wheel cylinder pressures are held.

In a state that the slave cylinder 20 does not operate (e.g., in an ignition-off state or a state that no electric power is obtained), the first switching valve 51, the second switching valve 52, and the normally closed solenoid valve 8 are returned to their initial states. As a result, connection is established between the upstream side and the downstream side of each of the main hydraulic passages 2a and 2b. In this state, a hydraulic pressure generated by the master cylinder 10 is transmitted to the wheel cylinders W via the hydraulic control device 30.

Next, a description will be made of the arrangement of the master cylinder 10, the slave cylinder 20, the stroke simulator 40, the hydraulic control device 30, and the electronic control unit 90 in the hydraulic pressure generation apparatus 1. In the following, the arrangement of the above devices in a state that the hydraulic pressure generation apparatus 1 is installed in a vehicle will be described.

Figure 3:
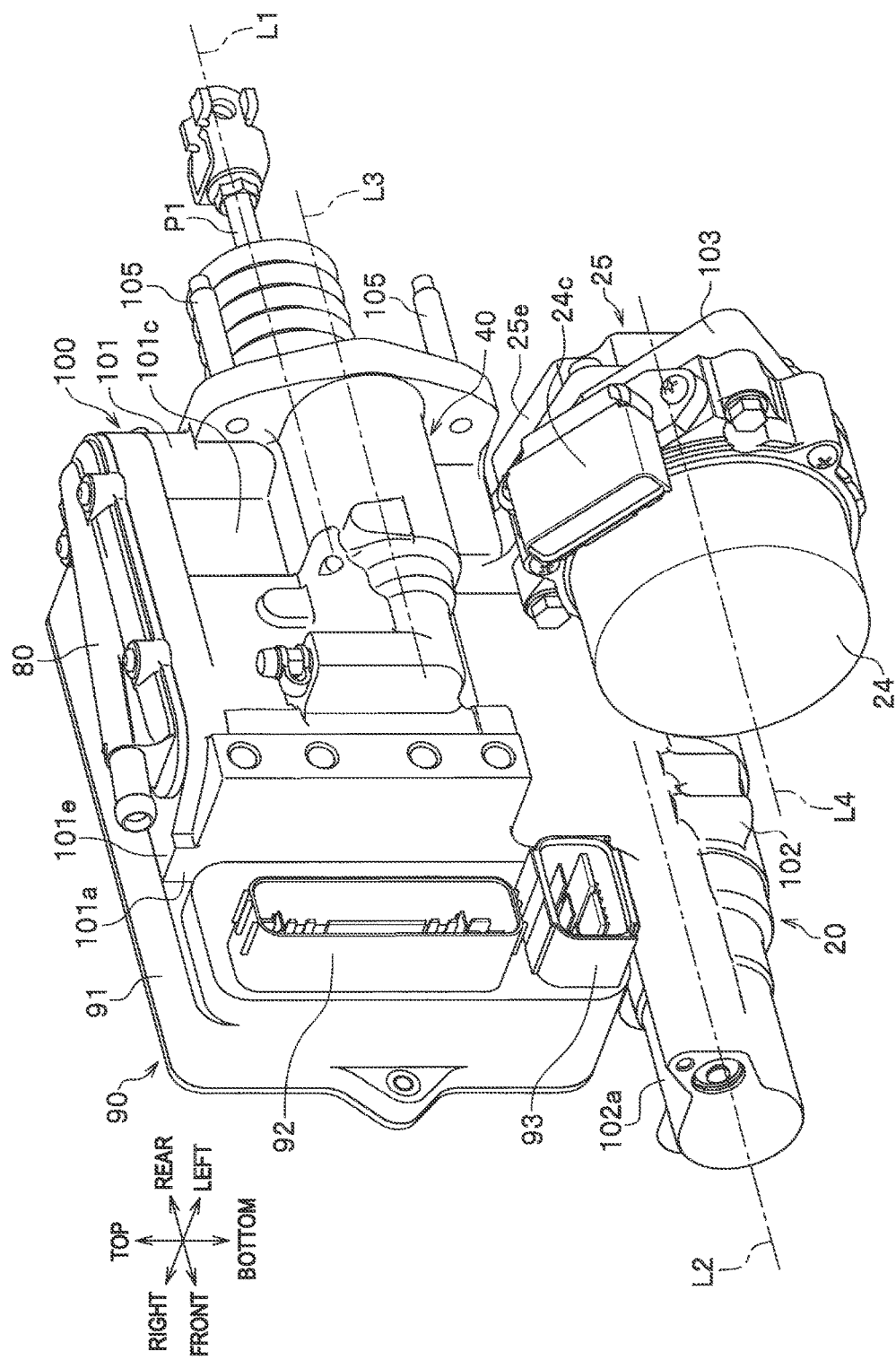
FIG. 3 is a perspective view of the hydraulic pressure generation apparatus according to the embodiment as viewed from a top-front-left position.

As shown in FIGS. 2 and 3, a top portion 101 of the base body 100 is approximately shaped like a cuboid. As shown in FIG. 7, the top portion 101 is formed with the first cylinder hole 11 and the third cylinder hole 41. As shown in FIG. 2, the reservoir tank 80 is attached to the top surface 101e of the top portion 101.

Figure 5:
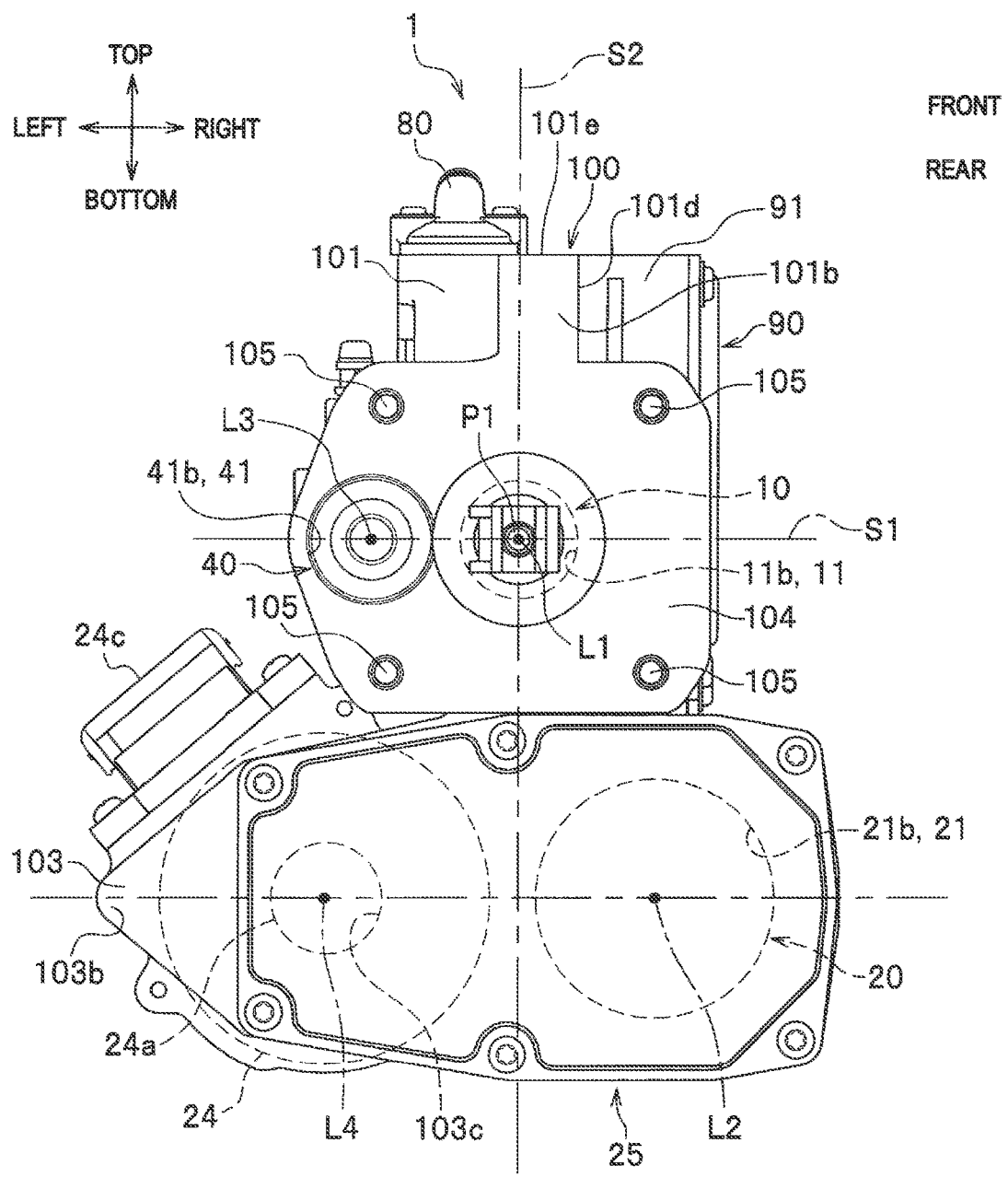
FIG. 5 is a rear view of the hydraulic pressure generation apparatus according to the embodiment.
Figure 6:
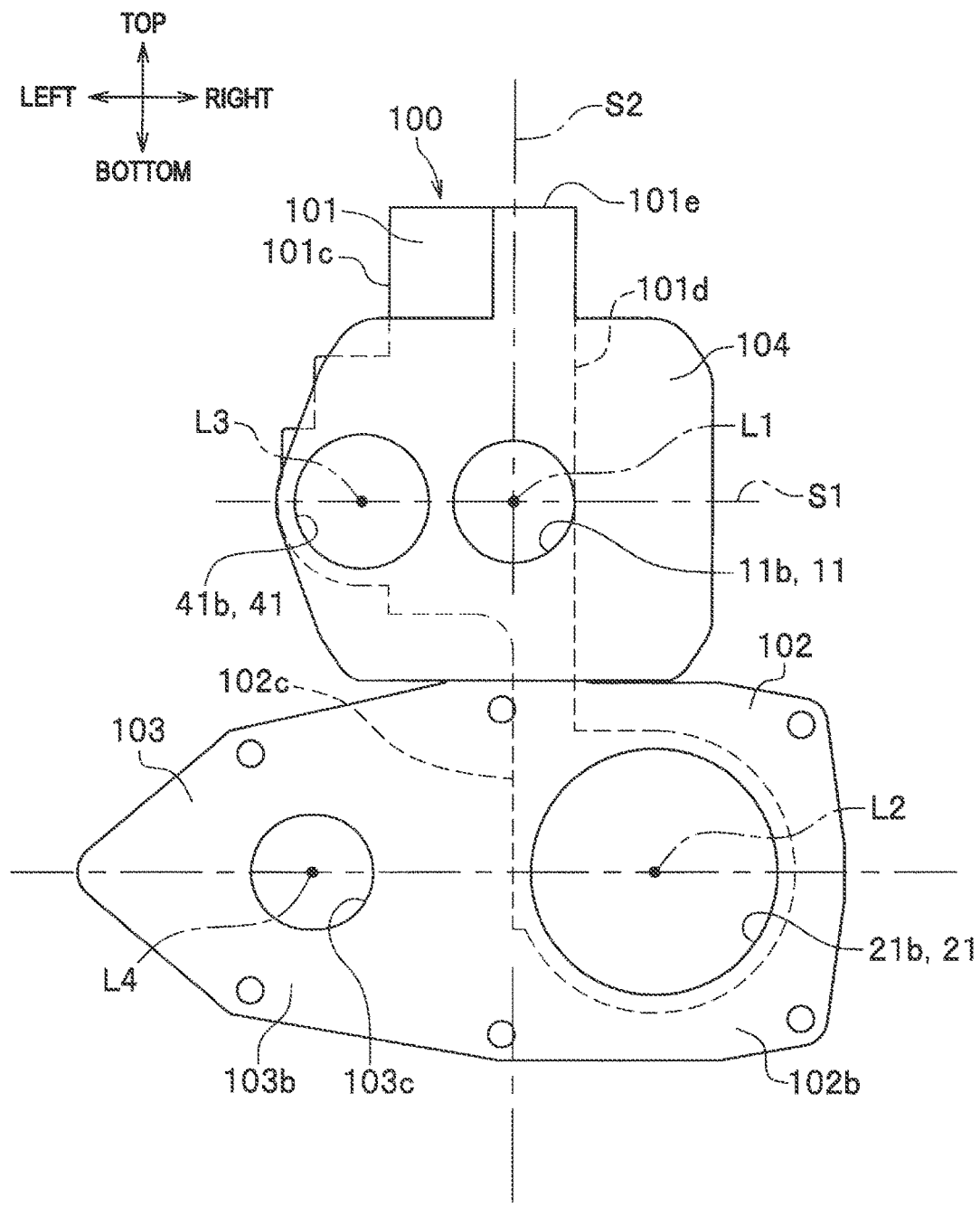
FIG. 6 is a rear view of a base body of the hydraulic pressure generation apparatus according to the embodiment.

As shown in FIGS. 5 and 6, the first cylinder hole 11 of the master cylinder 10 is formed in the top portion 101 of the base body 100 at the center in both of the top-bottom direction and the left-right direction.

The first cylinder hole 11 is a bottomed cylindrical hole. As shown in FIG. 7, the axial line L1 of the first cylinder hole 11 extends in the front-rear direction. The first cylinder hole 11 has an opening at the rear end, that is, in the rear surface 101b of the top portion 101. That is, the first cylinder hole 11 is open to the rear side.

As shown in FIG. 4, the rear surface 101b of the top portion 101 of the base body 100 has a vehicle body attachment surface 104, which is a surface that is attached to the front surface of a dashboard B which is a boundary between an engine room and a vehicle compartment.

As shown in FIG. 5, the opening 11b of the first cylinder hole 11 is formed in the vehicle body attachment surface 104 at the center. Four stud bolts 105 are erected from the vehicle body attachment surface 104 at four corner positions.

To attach the base body 100 to the dashboard B, as shown in FIG. 4 the stud bolts 105 are inserted into respective attachment holes (not shown) of the dashboard B from the engine room side (from the left side in FIG. 4). And tip portions of the stud bolts 105 are attached to a vehicle body frame (not shown) on the side of the vehicle compartment (on the right side in FIG. 4). In this manner, the base body 100 can be fixed to the front surface of the dashboard B.

As shown in FIGS. 5 and 6, the top portion 101 of the base body 100 is formed with the third cylinder hole 41 of the stroke simulator 40 on the left of the first cylinder hole 11. The third cylinder hole 41 is a bottomed cylindrical hole. As shown in FIG. 7, the axial line L3 of the third cylinder hole 41 extends in the front-rear direction.

The axial line L3 of the third cylinder hole 41 is parallel with the axial line L1 of the first cylinder hole 11. Thus, the first cylinder hole 11 and the third cylinder hole 41 are arranged side by side and parallel with each other. As shown in FIG. 6, the axial line L3 of the third cylinder hole 41 and the axial line L1 of the first cylinder hole 11 are arranged in the left-right direction in a horizontal reference plane S1 (imaginary plane).

The third cylinder hole 41 has an opening in the rear surface 101b of the top portion 101 of the base body 100. That is, the third cylinder hole 41 is open to the rear side.

As shown in FIG. 3, an approximately left half circumferential wall of the third cylinder hole 41 projects leftward from a left side surface 101c of the top portion 101.

As shown in FIG. 6, a bottom portion 102 of the base body 100 is continuous with its top portion 101 and projects rightward with respect to a right side surface 101d of the top portion 101. A left side surface 102c of the bottom portion 102 is offset rightward from the left side surface 101c of the top portion 101.

As shown in FIG. 7, the rear surface 102b of the bottom portion 102 is offset forward from the rear surface 101b (vehicle body attachment surface 104) of the top portion 101. A front portion 102a of the bottom portion 102 projects forward with respect to a front surface 101a of the top portion 101.

As shown in FIGS. 5 and 6, the bottom portion 102 of the base body 100 is formed with the second cylinder hole 21 of the slave cylinder 20. The second cylinder hole 21 is a bottomed cylindrical hole. As shown in FIG. 7, the axial line L2 of the second cylinder hole 21 extends in the front-rear direction.

As shown in FIG. 6, the second cylinder hole 21 is located below the first cylinder hole 11 and the third cylinder hole 41 on the bottom-right of the first cylinder hole 11.

The front portion 102a of the bottom portion 102 of the base body 100 corresponds to a portion of the slave cylinder 20 near the bottom surface 21a of the second cylinder hole 21. As shown in FIG. 7, the front portion 102a projects forward (i.e., outward in the axial direction of the second cylinder hole 21) with respect to the other portions of the base body 100.

As shown in FIG. 7, the axial line L2 of the second cylinder hole 21 is parallel with the axial lines L1 of the first cylinder hole 11 and the axial lines L3 of the third cylinder hole 41. Thus, the first cylinder hole 11, the second cylinder hole 21, and the third cylinder hole 41 are arranged parallel with each other.

The second cylinder hole 21 has an opening in the rear surface 102b of the bottom portion 102 of the base body 100. That is, the second cylinder hole 21 is open to the rear side.

As shown in FIG. 6, a rear end portion of the bottom portion 102 of the base body 100 is formed with the flange 103 which projects leftward. The flange 103 is a plate-like portion which is erected perpendicularly to the left side surface 102c of the bottom portion 102.

As shown in FIG. 4, the front surface of the flange 103 is a motor attachment surface 103a to which the motor 24 is attached. The rear surface of the flange 103 is a drive power transmission unit attachment surface 103b to which the drive power transmission unit 25 is attached.

The drive power transmission unit attachment surface 103b of the flange 103 is continuous with the rear surface 102b of the bottom portion 102, and they form the same surface. Like the rear surface 102b of the bottom portion 102, the drive power transmission unit attachment surface 103b is offset forward from the rear surface 101b of the top portion 101. That is, the drive power transmission unit attachment surface 103b is located on the front side of the vehicle body attachment surface 104 of the top portion 101.

The motor 24 is attached to the motor attachment surface 103a of the flange 103. The front end surface of the motor 24 is located in the rear of the front surface 101a of the top portion 101 of the base body 100. The motor 24 is disposed at a position that is close to the center of the base body 100 in the front-rear direction.

The insertion hole 103c penetrates through the flange 103 in the front-rear direction. The output shaft 24a which projects rearward from the rear surface of the motor 24 is inserted through the insertion hole 103c and projects rearward past the drive power transmission unit attachment surface 103b.

As shown in FIG. 6, the insertion hole 103c of the flange 103 is located below the first cylinder hole 11 and the third cylinder hole 41 on the bottom-left of the first cylinder hole 11. Thus, when the motor 24 is attached to the flange 103, as shown in FIG. 5 its output shaft 24a is located below the first cylinder hole 11 and the third cylinder hole 41 on the bottom-left of the first cylinder hole 11.

In a state that the motor 24 is attached to the flange 103, as shown in FIG. 4, the axial line L4 of the output shaft 24a extends in the front-rear direction.

The axial line L4 of the output shaft 24a is parallel with the axial lines L1, L2, and L3 of the cylinder holes 11, 21, and 41. Thus, the output shaft 24a is parallel with the cylinder holes 11, 21, and 41. As shown in FIG. 5, the axial line L4 of the output shaft 24a and the axial line L2 of the second cylinder hole 21 are arranged side by side in the left-right direction in a horizontal plane.

As shown in FIG. 1, components of the drive power transmission unit 25 are attached to the rear surface 102b of the bottom portion 102 of the base body 100 and the drive power transmission unit attachment surface 103b of the flange 103.

As shown in FIG. 4, the forward offset of the rear surface 102b of the bottom portion 102 and the drive power transmission unit attachment surface 103b of the flange 103 from the vehicle body attachment surface 104 of the top portion 101 is set so that the rear end of the cover member 25e of the drive power transmission unit 25 does not project rearward with respect to the vehicle body attachment surface 104.

Thus, when the vehicle body attachment surface 104 of the base body 100 is attached to the dashboard B, the cover member 25e of the drive power transmission unit 25 is set between the front surface of the dashboard B and the drive power transmission unit attachment surface 103b of the flange 103 of the base body 100, and the drive power transmission unit 25 does not contact the dashboard B.

As shown in FIG. 7, the right side surface 101d of the top portion 101 of the base body 100 is formed with plural attachment holes 110 for mounting of the various kinds of valves 51, 52, 61, 62, 8, 31, and 32 (see FIG. 1) and the two pressure sensors 6 and 7 (see FIG. 1).

As shown in FIG. 2, the housing 91 of the electronic control unit 90 is attached to the right side surface 101d of the top portion 101. The various kinds of valves 51, 52, 61, 62, 8, 31, and 32 and the two pressure sensors 6 and 7 which are mounted in the respective attachment holes 110 (see FIG. 7) are covered with the housing 91.

The housing 91 is disposed over the second cylinder hole 21. Thus, as shown in FIG. 5, the housing 91 and the slave cylinder 20 are arranged in the top-bottom direction on the right of the top portion 101 of the base body 100.

As shown in FIG. 3, a front portion of the housing 91 projects forward with respect to the front surface 101a of the top portion 101 of the base body 100. A left side surface of the front portion of the housing 91 is formed with an external connection connector 92 and a motor connection connector 93.

The external connection connector 92 is a connector to which a connector that is provided at one end of an external wiring cable (not shown) is to be connected. The external connection connector 92 is disposed in front of the front surface 101a of the top portion 101.

The motor connection connector 93 is disposed under the external connection connector 92. The motor connection connector 93 is a connector to be connected to a motor connector 24c of the motor 24 by a cable (not shown).

In the hydraulic pressure generation apparatus 1 according to the embodiment, as shown in FIG. 5, the second cylinder hole 21 and the motor 24 (output shaft 24a) are located under the horizontal reference plane S1 (imaginary plane) which includes the axial line L1 of the first cylinder hole 11 and the axial line L3 of the third cylinder hole 41.

The third cylinder hole 41 and the motor 24 (output shaft 24a) are located on the left of a vertical reference plane S2 (imaginary plane) which includes the axial line L1 of the first cylinder hole 11. The second cylinder hole 21 is located on the right of the vertical reference plane S2.

As described above, in the hydraulic pressure generation apparatus 1, the second cylinder hole 21 and the motor 24 are located below the first cylinder hole 11 on the right and left of the vertical reference plane S2 including the axial line L1 of the first cylinder hole 11, respectively.

Thus, when the hydraulic pressure generation apparatus 1 is viewed in the front-rear direction, the center (axial line L1) of the first cylinder hole 11, the center (axial line L2) of the second cylinder hole 21, and the center (axial line L4) of the output shaft 24a have such a positional relationship that lines connecting them form a triangle. That is, when the hydraulic pressure generation apparatus 1 is viewed in the front-rear direction, the first cylinder hole 11 (master cylinder 10) is located at the top apex of the triangle, and the second cylinder hole 21 (slave cylinder 20) and the output shaft 24a (motor 24) are located at the left-right ends of the base of the triangle, respectively.

In the above-described hydraulic pressure generation apparatus 1, as shown in FIG. 4, the axial lines L1, L2, and L3 of the cylinder holes 11, 21, and 41 and the axial line L4 of the output shaft 24a of the motor 24 are arranged parallel with each other, whereby the cylinder holes 11, 21, and 41 and the motor 24 are arranged in a well-balanced manner.

In the hydraulic pressure generation apparatus 1 according to the embodiment, as shown in FIG. 5, the slave cylinder 20 and the motor 24 are located below the master cylinder 10 on the right and left of the master cylinder 10, respectively, whereby the center of gravity of the hydraulic pressure generation apparatus 1 is set low. In particular, since the motor 24 which is a heavy component is disposed at a low position in the hydraulic pressure generation apparatus 1, the weight balance of the master cylinder 10, the slave cylinder 20, and the motor 24 can be made stable and hence the stability of the hydraulic pressure generation apparatus 1 can be enhanced effectively.

In the hydraulic pressure generation apparatus 1 according to the embodiment, the housing 91 and the slave cylinder 20 are arranged in the top-bottom direction, the space concerned around the base body 100 is utilized effectively, whereby the hydraulic pressure generation apparatus 1 can be miniaturized.

In the hydraulic pressure generation apparatus 1 according to the embodiment, since the first cylinder hole 11 and the third cylinder hole 41 are arranged adjacent to each other in the left-right direction in a horizontal plane, the master cylinder 10 can be linked to the stroke simulator 40 easily. Since the master cylinder 10 and the stroke simulator 40 are arranged compactly, the hydraulic pressure generation apparatus 1 can be miniaturized.

Figure 8:
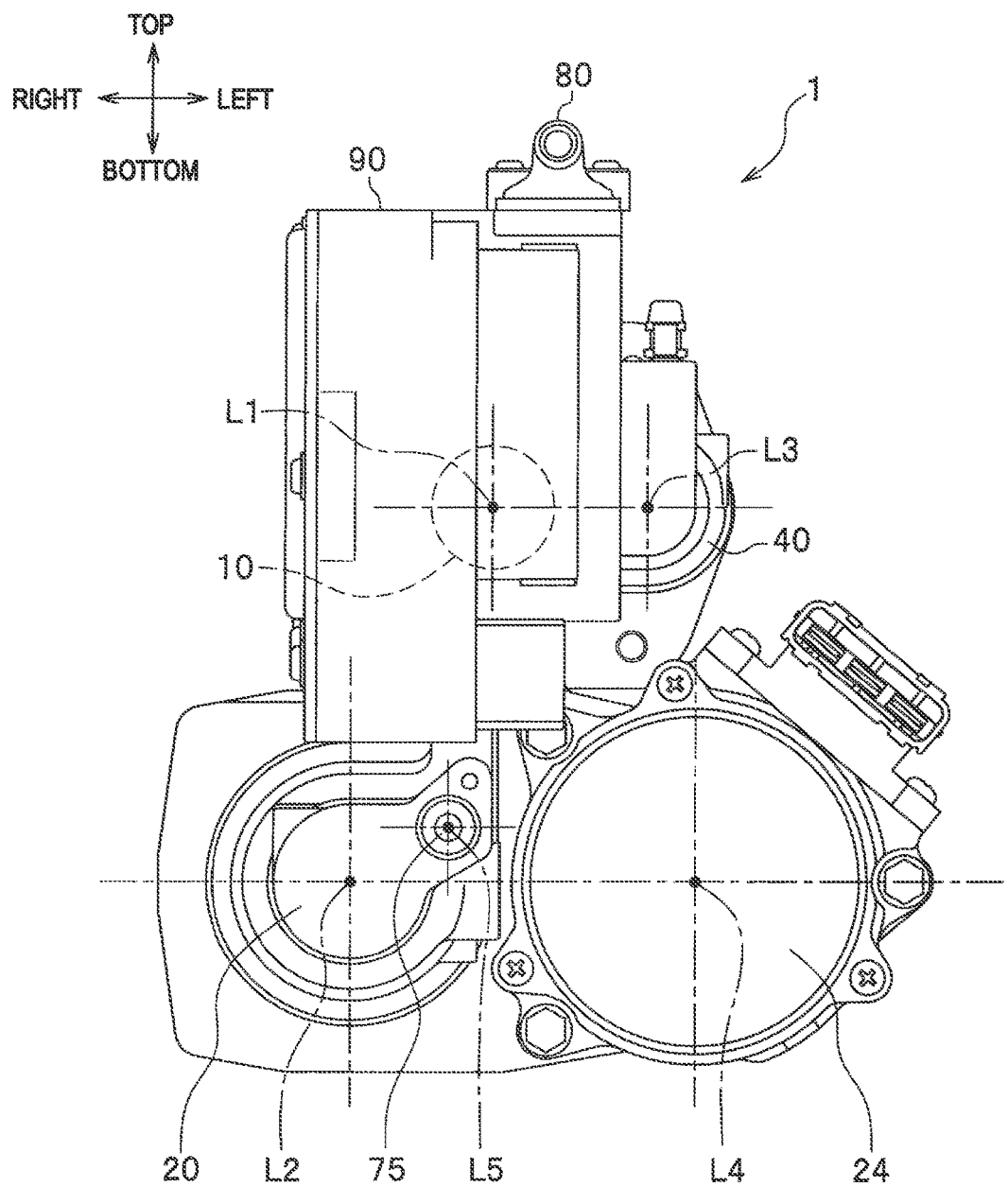
FIG. 8 is a front view of the hydraulic pressure generation apparatus according to the embodiment.
Figure 9:
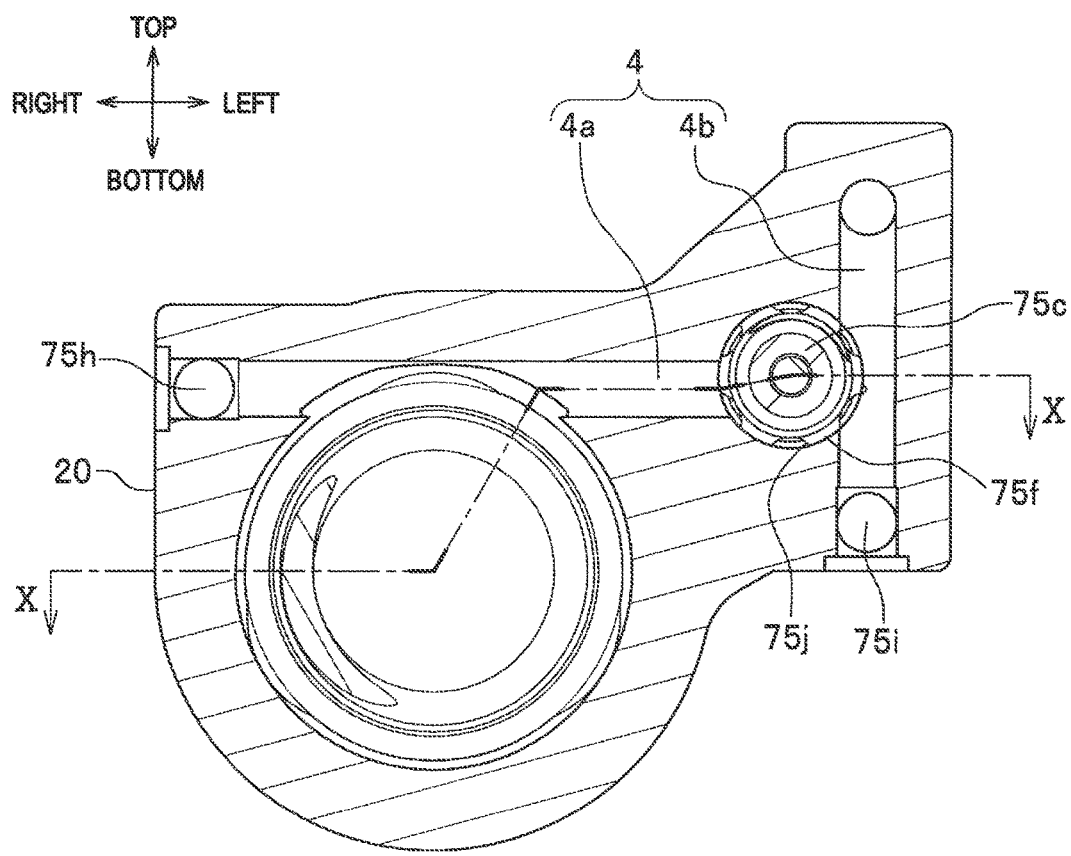
FIG. 9 is a sectional view taken along line IX-IX in FIG. 7.
Figure 10:
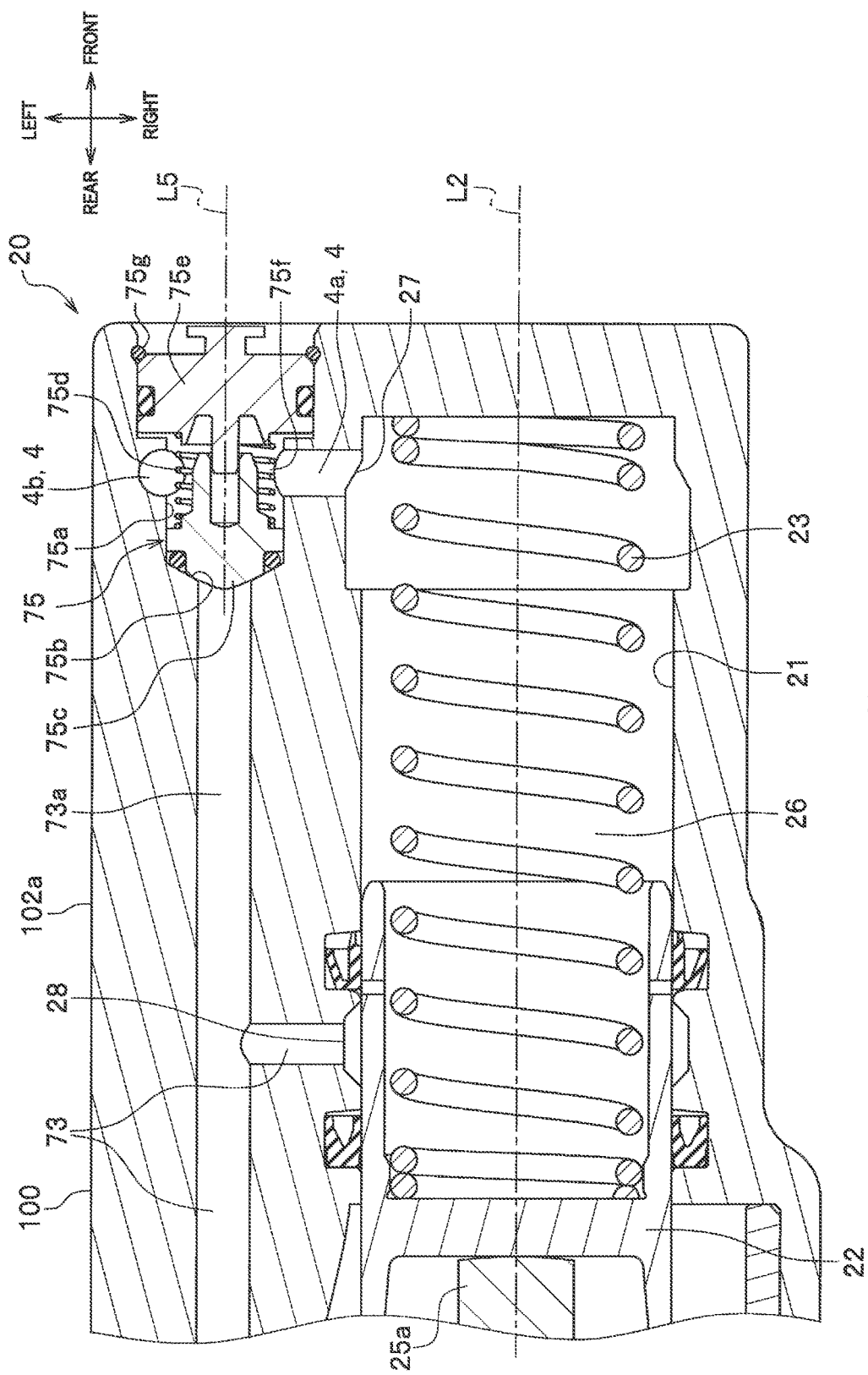
FIG. 10 is a sectional view taken along line X-X in FIG. 9.

Next, the check valve 75 (see FIG. 1) will be described. FIG. 8 is a front view of the hydraulic pressure generation apparatus 1. FIG. 9 is a sectional view taken along line IX-IX in FIG. 7. FIG. 10 is a sectional view taken along line X-X in FIG. 9. In FIG. 9, the background of the cutting surface (i.e., what exist outside the cutting surface) is omitted.

As shown in FIG. 10, the check valve 75 is disposed near a brake fluid discharge port 27 of the second cylinder hole 21 of the slave cylinder 20. More specifically, the shortest separation distance between the check valve 75 and the discharge port 27 is shorter than or equal to the diameter of the second cylinder hole 21 (i.e., the outer diameter of the second piston 22), preferably shorter than or equal to the radius of the second cylinder hole 21.

The check valve 75 is disposed in a hole 75a which is circular in cross section and communicates with the branch supply passage 73a. The hole 75a has an opening in the front end surface of the front portion 102a of the base body 100. The check valve 75 is equipped with a valve seat 75b which is formed at the rear end of the hole 75a, a valve plug 75c which is disposed in front of the valve seat 75b, a coil spring 75d for urging the valve plug 75c toward the valve seat 75b, and a lid member 75e with which the rear end of the coil spring 75d is in contact.

The valve plug 75c is provided with a sealing member for sealing between the valve seat 75b and the valve plug 75c. A valve room 75f is formed as a room, between the valve plug 75c and the valve plug 75c, of the hole 75a. As shown in FIG. 9, the outer circumferential surface, to slide on the inner circumferential surface of the hole 75a, of the valve plug 75c is formed with plural cuts 75j which are arranged in the circumferential direction and serve to connect a rear end portion of the hole 75a and the valve room 75f.

The lid member 75e is locked on a lock member 75g such as a stop ring so as not to come off the hole 75a. The lid member 75e is provided with a sealing member for sealing between the inner circumferential surface of the hole 75a and the outer circumferential surface of the lid member 75e.

The slave cylinder supply passage 73 is connected to a brake fluid suction port 28 of the second cylinder hole 21. The branch supply passage 73a which branches off the slave cylinder supply passage 73 is connected to the rear end portion (valve-seat-75b-side portion) of the hole 75a.

As shown in FIGS. 9 and 10, the common hydraulic passage 4 (see FIG. 1) has a discharge-port-side hydraulic passage 4a which connects the discharge port 27 of the second cylinder hole 21 and the valve room 75f and a communication-passage-side hydraulic passage 4b which connects the valve room 75f and the two communication passages 5a and 5b. The discharge-port-side hydraulic passage 4a and the communication-passage-side hydraulic passage 4b communicate with each other via the valve room 75f.

A right-side opening of the discharge-port-side hydraulic passage 4a is closed by a closing member 75h such as a ball or a plug. A bottom-side opening of the communication-passage-side hydraulic passage 4b is closed by a closing member 75i such as a ball or a plug.

As shown in FIG. 9, the communication-passage-side hydraulic passage 4b extends upward from the bottom-side opening, is then bent in an L shape, and then extends rearward parallel with the axial line L2 of the second cylinder hole 21. A front-side opening of the portion, parallel with the axial line L2, of the communication-passage-side hydraulic passage 4b is closed by a closing member.

As shown in FIG. 10, the supply passage from the reservoir tank 80 to the pressure chamber 26 (discharge port 27) of the slave cylinder 20 consists of part of the slave cylinder supply passage 73, the branch supply passage 73a, and the discharge-port-side hydraulic passage 4a of the common hydraulic passage 4.

The axial line L5 of the check valve 75 is parallel with the axial line L2 of the second cylinder hole 21. Of the above-mentioned supply path from reservoir tank 80 to the pressure chamber 26 of the slave cylinder 20, a portion which extends from the check valve 75 toward the reservoir tank 80, that is, the branch supply passage 73a, is parallel with the axial line L2 of the second cylinder hole 21.

As shown in FIG. 8, the check valve 75 is disposed on the master cylinder 10 side of the slave cylinder 20. More specifically, when viewed in the axial line L2 of the second cylinder hole 21, the check valve 75 is disposed on the master cylinder 10 side of a plane that is perpendicular to a line that connects the center (axial line L1) of the first cylinder hole 11 (see FIG. 5) and the center (axial line L2) of the second cylinder hole 21 (see FIG. 5) and includes the axial line L2. The axial line L5 of the check valve 75 is located above the horizontal plane including the axial line L2.

The check valve 75 is disposed on the motor 24 side of the slave cylinder 20. More specifically, when viewed in the axial line L2 of the second cylinder hole 21, the check valve 75 is disposed on the motor 24 side of a plane that is perpendicular to a line that connects the center (axial line L2) of the second cylinder hole 21 (see FIG. 5) and the center (axial line L4) of the output shaft 24a of the motor 24 (see FIG. 5) and includes the axial line L2. The check valve 75 is located on the left of the vertical plane including the axial line L2.

When viewed in the axial line L2 of the second cylinder hole 21, a triangle is formed that connects the center (axial line L1) of the first cylinder hole 11, the center (axial line L2) of the second cylinder hole 21, and the center (axial line L4) of the output shaft 24a of the motor 24. In the embodiment, when viewed in the axial line L2 of the second cylinder hole 21, the axial line L5 of the check valve 75 is located inside this triangle above the axial line L2 of the second cylinder hole 21.

Next, a fluid suction control will be described. Brake fluid is secured in the pressure chamber 26 in such an amount as to be necessary in an ordinary brake control excluding special brake controls such as performed at the time of emergency braking.

In the fluid suction control, the first shutoff valve 61 and the second shutoff valve 62 are closed and the second piston 22 is driven in a pressure reducing direction (return direction). Thus, the pressure in the pressure chamber 26 is decreased to establish a negative pressure state with the hydraulic pressures of the wheel cylinders W held. As a result, brake fluid is sucked from the reservoir tank 80 into the pressure chamber 26 through the supply passage consisting of part of the slave cylinder supply passage 73, the branch supply passage 73a, and the discharge-outlet-side hydraulic passage 4a and the discharge port 27. At this time, the check valve 75 permits inflow of brake fluid to the pressure chamber 26 by operating in such a manner that the valve plug 75c is moved away from the valve seat 75b.

When the first shutoff valve 61 and the second shutoff valve 62 are opened and the second piston 22 is driven in a pressure increasing direction (forward) after an end of the fluid suction control, the brake fluid is pressurized in the pressure chamber 26. At this time, the check valve 75 prevents inflow of brake fluid from the slave cylinder 20 to the reservoir tank 80 because the valve plug 75c is pressed against the valve seat 75b.

As described above, in the hydraulic pressure generation apparatus 1 according to the embodiment, the base body 100 has the supply passage leading from the reservoir tank 80 to the pressure chamber 26 (discharge port 27) of the slave cylinder 20. This supply passage is provided with the check valve 75 which permits only inflow of brake fluid from the reservoir tank 80 to the slave cylinder 20. As shown in FIG. 10, the check valve 75 is disposed near the discharge port 27 of the second cylinder hole 21 of the slave cylinder 20.

Since check valve 75 is disposed near the discharge port 27 of the slave cylinder 20, the hydraulic pressure generation apparatus 1 can be laid out more easily while high-efficiency suction of brake fluid is secured.

In the embodiment, as shown in FIG. 7, the front portion 102a, located on side of the bottom surface 21a of the second cylinder hole 21, of the slave cylinder 20 projects outward in the direction of the axial line L2 of the second cylinder hole 21 with respect to the other portions of the base body 100.

With this structure, the base body 100 can be reduced in weight and the space occupied by the front portion 102a, located on side of the bottom surface 21a of the second cylinder hole 21, of the base body 100 can be narrowed. This makes it easier to mount the hydraulic pressure generation apparatus 1 in a vehicle.

In the embodiment, as shown in FIG. 10, the axial line L5 of the check valve 75 is parallel with the axial line L2 of the second cylinder hole 21. This makes it possible to install the check valve 75 compactly adjacent to the second cylinder hole 21 of the slave cylinder 20 outside it in its radial direction.

In the embodiment, as shown in FIG. 8, the check valve 75 is disposed on the master cylinder 10 side of the slave cylinder 20. This makes it possible to install the check valve 75 in such a manner that it does not stick out to outside the hydraulic pressure generation apparatus 1, utilizing a space between the slave cylinder 20 and the master cylinder 10.

In the embodiment, the check valve 75 is disposed on the motor 24 side of the slave cylinder 20. This makes it possible to install the check valve 75 in such a manner that it does not stick out to outside the hydraulic pressure generation apparatus 1, utilizing a space between the slave cylinder 20 and the motor 24.

In the embodiment, the axial line L5 of the check valve 75 is located inside a triangle that connects the center (axial line L1) of the first cylinder hole 11, the center (axial line L2) of the second cylinder hole 21, and the center (axial line L4) of the output shaft 24a of the motor 24. This makes it possible to install the check valve 75 in such a manner that it does not stick out to outside the hydraulic pressure generation apparatus 1 (i.e., it is located inside the hydraulic pressure generation apparatus 1), utilizing a space surrounded by the master cylinder 10, the slave cylinder 20, and the motor 24.

In the embodiment, the axial line L5 of the check valve 75 is located above the axial line L2 of the second cylinder hole 21. This structure helps air bubbles that might otherwise be contained in brake fluid escape upward. This makes it possible to improve the property of bleeding air from the brake fluid to be pressurized that exists in the slave cylinder 20.

In the embodiment, as shown in FIG. 10, the branch supply passage 73a of the supply passage leading from the reservoir tank 80 to the pressure chamber 26 of the slave cylinder 20 is parallel with the axial line L2 of the second cylinder hole 21. This makes it possible to install the hydraulic passage that extends from the check valve 75 toward the reservoir tank 80 compactly adjacent to the second cylinder hole 21 of the slave cylinder 20 outside it in its radial direction.

Figure 11:
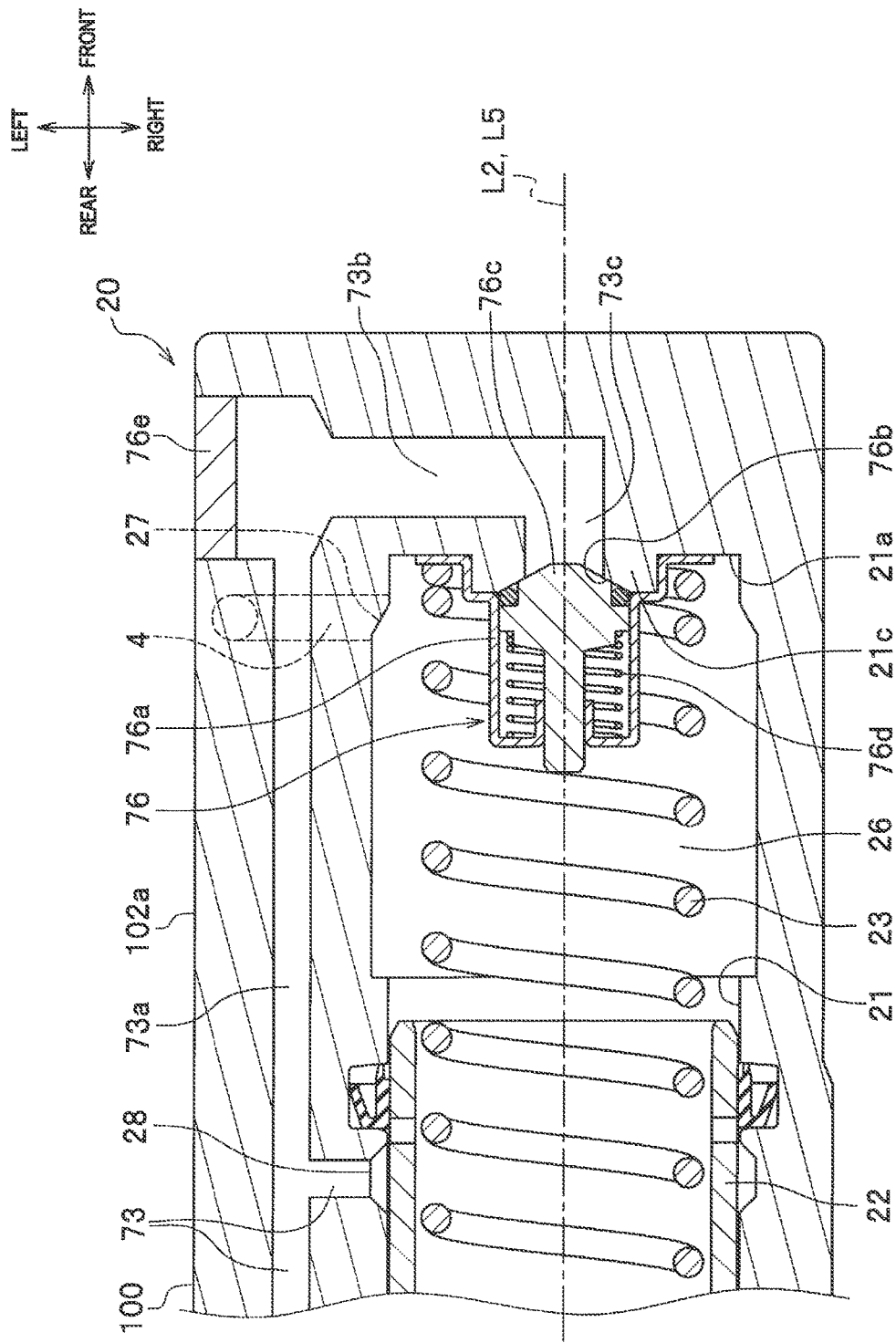
FIG. 11 is a sectional view showing a check valve employed in another embodiment and its neighborhood.

Next, another embodiment will be described by referring to FIG. 11. Differences from the above embodiment will be described mainly and components etc. having the same ones in the above embodiment may be omitted where appropriate. FIG. 11, which corresponds to FIG. 10, is a sectional view of a check valve 76 according to this embodiment and its neighborhood.

As shown in FIG. 11, the check valve 76 is disposed in the bottom surface 21a of the second cylinder hole 21. The bottom surface 21a is formed with a projection 21c at the center. An axial hole 73c is formed through the projection 21c so as to extend along the axial line L2 of the second cylinder hole 21. The branch supply passage 73a communicates with the axial hole 73c via a radial hole 73b which extends perpendicularly to the axial line L2 of the second cylinder hole 21. The radial hole 73b has an opening in the left side surface of the front portion 102a of the bottom portion 102, and the opening is closed by a closing member 76e.

The check valve 76 is equipped with a retainer 76a which is shaped like a bottomed cylinder. A front portion of the retainer 76a is fitted with the cylindrical projection 21c, and the front end surface of the retainer 76a is pressed against the bottom surface 21a by the coil spring 23 and thereby supported by it. The check valve 76 is also equipped with a valve seat 76b which is formed in the rear end of the axial hole 73c, a valve plug 76c which is disposed in the rear of the valve seat 76b and slides in the retainer 76a, and a coil spring 76d which urges the valve plug 76c toward the valve seat 76b. The rear end of the coil spring 76d is in contact with and is supported by the bottom surface, defining its internal space, of the retainer 76a. The wall of the retainer 76a is formed with a through-hole(s) (not shown) through which brake fluid is to pass.

The common hydraulic passage 4 (see FIG. 1) is connected directly to the discharge port 27 of the second cylinder hole 21.

The supply passage that is used at the time of a fluid suction control and leads from the reservoir tank 80 to the pressure chamber 26 of the slave cylinder 20 is composed of the slave cylinder supply passage 73, the branch supply passage 73a, the radial hole 73b, and the axial hole 73c.

In the embodiment shown in FIG. 11, as in the embodiment shown in FIG. 10, the check valve 76 is disposed near the brake fluid discharge port 27 of the second cylinder hole 21 of the slave cylinder 20.

On the other hand, in the embodiment shown in FIG. 10, the axial line L5 of the check valve 75 is parallel with the axial line L2 of the second cylinder hole 21. However, the invention is not limited to this case.

In the embodiment shown in FIG. 11, the axial line L5 of the check valve 76 coincides with the axial line L2 of the second cylinder hole 21. With this structure, the check valve 76 can be installed compactly adjacent to the second cylinder hole 21 of the slave cylinder 20 in its axial direction. The above expression "the axial line L5 coincides with the axial line L2" includes not only exact coincidence but also a case that they are inclined slightly from each other.

Although the embodiments have been described above, the invention is not limited to the embodiments and modifications can be made as appropriate without departing from the spirit and scope of the invention. And addition, deletion, or replacement can be made of part of the configuration of each embodiment.

For example, the second cylinder hole 21 and the output shaft 24a may be disposed above the first cylinder hole 11. The motor 24 may be disposed in such a manner that the output shaft 24a projects forward from the motor 24. The housing 91 may be disposed below the second cylinder hole 21. The master cylinder 10 may be a single piston type cylinder. The slave cylinder 20 may be a tandem piston type cylinder. Among the master cylinder 10, the stroke simulator 40, the slave cylinder 20, and the hydraulic control device 30 are provided in the base body 100, only the master cylinder 10 and the slave cylinder 20 may be provided in the base body 100.

Although in the hydraulic pressure generation apparatus 1 according to the embodiments the axial lines L1, L2, and L3 of the cylinder holes 11, 21, and 41 and the axial line L4 of the output shaft 24a of the motor 24 (and the axial line L5 of the check valve 75 shown in FIG. 10) are arranged parallel with each other, the invention is not limited to this case. The axial lines L1, L2, L3, and L4 (and L5) may be arranged approximately parallel with each other. That is, they may be either strictly parallel with each other or inclined slightly from each other. For example, the invention can be applied to a case that the axial line L1 of the first cylinder hole 11 and the axial line L2 of the second cylinder hole 21 are arranged perpendicularly to each other.

The invention claimed is:

1. A hydraulic pressure generation apparatus including:
   a base body;
   a motor attached to the base body;
   a reservoir tank which is attached to the base body and stores a brake fluid;
   a master cylinder which generates a brake hydraulic pressure by a first piston which is linked to a brake manipulator; and
   a slave cylinder which generates a brake hydraulic pressure by a second piston by the motor as a drive source, wherein the base body includes:
a first cylinder hole which is a bottomed cylinder hole, and in which the first piston is inserted;
a second cylinder hole which is a bottomed cylinder hole, and in which the second piston is inserted; and
a supply passage which leads from the reservoir tank to a hydraulic chamber of the slave cylinder,
wherein the supply passage is provided with a check valve which permits only inflow of brake fluid from the reservoir tank to a side of the slave cylinder,
wherein the check valve is disposed near a brake fluid discharge port of the second cylinder hole, and
wherein an axial line of the check valve is parallel with an axial line of the second cylinder hole.

2. The hydraulic pressure generation apparatus of claim 1, wherein a portion of the slave cylinder near a bottom surface of the second cylinder hole projects outward in a direction of an axial line of the second cylinder hole with respect to other portions of the base body.

3. The hydraulic pressure generation apparatus of claim 1, wherein the check valve is disposed on the master cylinder side of the slave cylinder.

4. The hydraulic pressure generation apparatus of claim 1, wherein the check valve is disposed on the motor side of the slave cylinder.

5. The hydraulic pressure generation apparatus of claim 1, wherein an axial line of the first cylinder hole, the axial line of the second cylinder hole, and an axial line of an output shaft of the motor are parallel with each other, and
wherein, when viewed in the axial line of the second cylinder hole, the axial line of the check valve is located inside a triangle that connects the axial line of the first cylinder hole, the axial line of the second cylinder hole, and the axial line of the output shaft.

6. The hydraulic pressure generation apparatus of claim 1, wherein the axial line of the check valve is located above the axial line of the second cylinder hole.

7. The hydraulic pressure generation apparatus of claim 1, wherein a hydraulic passage as a portion of the supply passage which extends from the check valve toward the reservoir tank is parallel with the axial line of the second cylinder hole.

8. A hydraulic pressure generation apparatus including:
a base body;
a motor attached to the base body;
a reservoir tank which is attached to the base body and stores a brake fluid;
a master cylinder which generates a brake hydraulic pressure by a first piston which is linked to a brake manipulator; and
a slave cylinder which generates a brake hydraulic pressure by a second piston by the motor as a drive source,
wherein the base body includes:
a first cylinder hole which is a bottomed cylinder hole, and in which the first piston is inserted;
a second cylinder hole which is a bottomed cylinder hole, and in which the second piston is inserted; and
a supply passage which leads from the reservoir tank to a hydraulic chamber of the slave cylinder,
wherein the supply passage is provided with a check valve which permits only inflow of brake fluid from the reservoir tank to a side of the slave cylinder,
wherein the check valve is disposed near a brake fluid discharge port of the second cylinder hole, and
wherein an axial line of the check valve coincides with an axial line of the second cylinder hole.

9. A hydraulic pressure generation apparatus including:
a base body;
a reservoir tank which is attached to the base body and stores a brake fluid;
wherein the base body includes:
a master cylinder comprising a cylinder hole which is a bottomed cylinder hole, and in which a first piston is inserted;
a slave cylinder comprising a cylinder hole which is a bottomed cylinder hole, and in which a second piston is inserted; and
a supply passage which leads from the reservoir tank to a hydraulic chamber of the slave cylinder,
a check valve in the supply passage disposed near a brake fluid discharge port of the slave cylinder, which permits only inflow of brake fluid from the reservoir tank to a side of the slave cylinder,
wherein a shortest separation distance between the check valve and the discharge port is shorter than or equal to a diameter of the cylinder hole of the slave cylinder.

10. The hydraulic pressure generation apparatus of claim 9, wherein the separation distance between the check valve and the discharge port is shorter than or equal to a radius of the cylinder hole of the slave cylinder.

11. The hydraulic pressure generation apparatus of claim 9, wherein the check valve is disposed in a hole which is circular in cross section and communicates with a branch supply passage, the hole has an opening in a front end surface of a front portion of the base body.

12. The hydraulic pressure generation apparatus of claim 11,
wherein the check valve is equipped with a valve seat which is formed at a rear end of the hole, a valve plug which is disposed in front of the valve seat, a coil spring for urging the valve plug toward the valve seat and a lid member with which the rear end of the coil spring is in contact, and
wherein an outer circumferential surface to slide on an inner circumferential surface of the hole of the valve plug is formed with plural cuts which are arranged in a circumferential direction and serve to connect a rear end portion of the hole and the valve room.

13. The hydraulic pressure generation apparatus of claim 11, wherein a slave cylinder supply passage is connected to a brake fluid suction port of the cylinder hole of the slave cylinder, and the branch supply passage branches off the slave cylinder supply passage which is connected to a rear end portion of the hole.

14. The hydraulic pressure generation apparatus of claim 9, wherein, when viewed in an axial line $L2$ of the cylinder hole of the slave cylinder, the check valve is disposed on the master cylinder side of a plane that is perpendicular to a line that connects an axial line $L1$ of the cylinder hole of the master cylinder and the axial line $L2$ of the cylinder hole of the slave cylinder.

15. The hydraulic pressure generation apparatus of claim 14, wherein an axial line $L5$ of the check valve is located above a horizontal plane including the axial line $L2$ and the axial line $L5$ of the check valve is parallel with the axial line $L2$ of the cylinder hole of the slave cylinder.

16. The hydraulic pressure generation apparatus of claim 9, wherein, when viewed in an axial line $L2$ of the cylinder hole of the slave cylinder, the check valve is disposed on the motor side of a plane that is perpendicular to a line that connects the axial line $L2$ and an axial line $L4$ of an output shaft of the motor.

17. The hydraulic pressure generation apparatus of claim 9, wherein, when viewed in an axial line L2 of the cylinder hole of the slave cylinder, a triangle is formed that connects an axial line L1 of the cylinder hole of the master cylinder, the axial line L2 of the cylinder hole of the slave cylinder, and an axial line L4 of an output shaft of the motor such that the check valve is located inside the triangle above the axial line L2 of the cylinder hole of the slave cylinder.

18. The hydraulic pressure generation apparatus of claim 17, wherein an axial line L5 of the check valve is located above the axial line L2 of the cylinder hole of the slave cylinder.

19. The hydraulic pressure generation apparatus of claim 9, wherein a branch supply passage of a supply passage leading from the reservoir tank to a pressure chamber of the slave cylinder is parallel with an axial line L2 of the cylinder hole of the slave cylinder.

\* \* \* \* \*